UNITED STATES PATENT OFFICE.

WILLIAM C. FERGUSON, OF GARDEN CITY, NEW YORK, ASSIGNOR TO NICHOLS COPPER CO., OF NEW YORK, N. Y., A CORPORATION OF NEW YORK.

PROCESS OF RECOVERING PLATINUM METALS.

1,315,660.      Specification of Letters Patent.      Patented Sept. 9, 1919.

No Drawing.      Application filed January 8, 1917. Serial No. 140,893.

*To all whom it may concern:*

Be it known that I, WILLIAM C. FERGUSON, a citizen of the United States, and a resident of Garden City, Nassau county, New York, have invented certain new and useful Improvements in Processes of Recovering Platinum Metals, of which the following is a specification.

My invention relates to the recovery of platinum and palladium from metal bearing substances and the subsequent separation of these metals from each other. My invention may be applied to slimes such as those obtained in the electrolytic refining of metals as, for instance, copper and may be applied to those obtained in the manufacture of blue vitriol and similar slimes or muds. I may also apply my invention to the recovery of the platinum metals from flue dusts or the like, the principal object of my invention being to extract these metals with a minimum waste of the precious metal and to accomplish the extraction in an economical manner. Electrolytic slimes generally contain gold, platinum, palladium, silver, copper, selenium, tellurium, arsenic, antimony, lead and silica in varying proportions and sometimes contain also traces of bismuth, nickel and iron. In my prior application for the treatment of electrolytic slimes, Serial No. 53,178, filed September 28, 1915, I describe a process for the recovery of the metal values from slimes of this character. The process described in said application consists essentially in subjecting slimes of the character described to a roasting operation in the presence of a sulfatizing agent until the sulfate of silver and copper are formed in substantial quantities. The roasted slimes are then subjected to an aqueous lixiviation whereby the bulk of the water soluble sulfates are separated from the solid residue containing the water insoluble constituents. The solid residue resulting from the lixiviation with water is lixiviated with dilute acid, such as sulfuric acid, whereby there is produced a second solid residue containing the acid insoluble constituents and a solution which contains substantially all the copper content of the first solid residue, a very small percentage of silver and possibly some impurities. The addition of hydrochloric acid or a suitable chlorid precipitates the silver with the residue as an insoluble chlorid. The insoluble residue contains essentially gold, silver, platinum, palladium, tellurium, and traces of copper and lead. The concentration of the platinum metals in an insoluble residue forms the first step in my invention.

My process further comprises the steps of treating the residue with a chlorinating substance such as for instance aqua regia. A soluble gold compound is formed which possibly is chlorauric acid. This soluble gold compound is precipitated with ferrous sulfate and may be separated from the solution. The insoluble silver is now recovered with a solvent such as sodium thiosulfate as described in my beforementioned prior application, the residue from this hypo treatment going to smelter. The acid solution remaining resulting from the chlorination contains practically all the platinum and palladium of the original slime, and also antimony, tellurium and traces of gold, lead and copper. The gold solution containing the beforementioned substance I now saturate with sulfur dioxid, as for instance by letting it bubble through the solution, meanwhile heating the solution, either while saturation is taking place or, afterward, to a temperature of about 200° F., until tellurium precipitates in appreciable quantities. All the platinum and palladium and some cuprous chlorid still remaining are precipitated by this reducing agent. This precipitate is separated by filtration and treated with concentrated sulfuric acid and heated until the temperature is obtained at which the acid fumes and all the tellurium compound present is decomposed, the volatile portions thereof being expelled from the solution. Chlorin of the copper chlorid is also expelled from the solution by this heating operation. I then drop crystals of sodium nitrate into the hot liquid until practically all the tellurium has become oxidized and the palladium dissolved. This solution is then diluted and filtered. Ferrous sulfate is then added and the palladium contained therein is precipitated, substantially free from tellurium or copper and containing traces of gold and platinum. The residue from the sulfuric acid treatment contains the platinum. The residue containing the gold and platinum is now dissolved with aqua regia. The result of this treatment produces a compound of gold and chlorin and platinum and chlorin, possibly the chlorauic and chlorplatinic acids. I then saturate the solution with ammonium chlorid until the platinum is precipitated as ammonium platinic chlorid. I then remove the platinum compound by filtration and expel or remove the ammonium and chlorin ions of the platinum compound, thereby securing the free platinum. The filtrate from the ammonium platinic chlorid is returned to an earlier stage of the process.

When I speak in my specification and claims of precious metals I mean gold, silver, platinum and palladium. When I speak of platinum metals, I mean platinum and palladium and when I speak of non-precious metals I mean all other metals not mentioned in this paragraph.

Various modifications may be made in the details without departing from the spirit and scope of the appended claims; the process described being merely for the purpose of illustrating an example of my invention.

I claim:—

1. The process of recovering platinum metals from electrolytic slimes which comprises subjecting such slimes to a sulfatizing roast, forming a concentrate of all the platinum metals contained therein and recovering said platinum metals substantially as and for the purpose described.

2. The process which comprises treating an electrolytic slime to render substantial quantities of the copper and silver soluble separating the soluble copper and silver from the residue containing substantially all the platinum metals of the slime and recovering said platinum metals from the residue.

In testimony whereof I have hereunto set my hand.

WILLIAM C. FERGUSON.